(12) United States Patent
Takahashi et al.

(10) Patent No.: US 12,042,940 B2
(45) Date of Patent: Jul. 23, 2024

(54) INTERFERENCE CHECK FOR ROBOT OPERATION

(71) Applicant: KABUSHIKI KAISHA YASKAWA DENKI, Kitakyushu (JP)

(72) Inventors: Makoto Takahashi, Fukuoka (JP); Wataru Watanabe, Fukuoka (JP); Yutaro Uchida, Fukuoka (JP); Ryo Kabutan, Fukuoka (JP); Keita Satsuma, Fukuoka (JP)

(*) Notice: Subject to any disclaimer, the term of this patent is extended or adjusted under 35 U.S.C. 154(b) by 295 days.

(21) Appl. No.: 17/752,862

(22) Filed: May 25, 2022

(65) Prior Publication Data

US 2022/0281111 A1 Sep. 8, 2022

Related U.S. Application Data

(63) Continuation of application No. PCT/JP2020/040842, filed on Oct. 30, 2020.

(30) Foreign Application Priority Data

Nov. 27, 2019 (JP) .................................. 2019-214768

(51) Int. Cl.
 *B25J 9/16* (2006.01)
(52) U.S. Cl.
 CPC ........... *B25J 9/1666* (2013.01); *B25J 9/1661* (2013.01); *B25J 9/1671* (2013.01)
(58) Field of Classification Search
 CPC ...... B25J 9/1666; B25J 9/1661; B25J 9/1671; G05B 2219/40317; G05B 2219/40477
 See application file for complete search history.

(56) References Cited

U.S. PATENT DOCUMENTS

| 5,937,143 A | 8/1999 | Watanabe et al. |
| 6,167,328 A | 12/2000 | Takaoka et al. |

(Continued)

FOREIGN PATENT DOCUMENTS

| CN | 1680079 | 10/2005 |
| CN | 103885817 | 6/2014 |

(Continued)

OTHER PUBLICATIONS

Van Henten, E. J., E. J. Schenk, L. G. Van Willigenburg, J. Meuleman, and P. Barreiro., "Collision-free inverse kinematics of the redundant seven-link manipulator used in a cucumber picking robot", Biosystems engineering 106, No. 2, 2010, p. 112-p. 124.

(Continued)

*Primary Examiner* — Bhavesh V Amin
(74) *Attorney, Agent, or Firm* — SOEI PATENT & LAW FIRM

(57) ABSTRACT

A simulation system includes circuitry configured to: determine placement of a robot with respect to another object in a virtual space, based on a placement constraint applied to the robot for executing a plurality of tasks; generate a path representing a trajectory of at least a portion of the robot or a tool operated by the robot during the tasks, based on a spatial relationship between the determined placement of the robot and the other object that satisfies the placement constraint; execute an operation program including the generated path in the virtual space in which the robot and the other object are placed; and check whether the robot interferes with the other object, based on the spatial relationship between the determined placement of the robot and the other object along the generated path in the virtual space, as a result of executing the tasks in the operation program.

20 Claims, 5 Drawing Sheets

(56) References Cited

U.S. PATENT DOCUMENTS

| | | |
|---|---|---|
| 6,292,715 B1 | 9/2001 | Rongo |
| 8,742,290 B2 | 6/2014 | Oe et al. |
| 2003/0225479 A1 | 12/2003 | Waled |
| 2005/0107921 A1 | 5/2005 | Watanabe et al. |
| 2005/0224479 A1 | 10/2005 | Watanabe et al. |
| 2007/0106421 A1 | 5/2007 | Kamrani et al. |
| 2008/0114492 A1 | 5/2008 | Miegel et al. |
| 2009/0326711 A1 | 12/2009 | Chang et al. |
| 2010/0023164 A1 | 1/2010 | Yoshizawa |
| 2010/0204828 A1 | 8/2010 | Yoshizawa et al. |
| 2012/0215351 A1 | 8/2012 | McGee et al. |
| 2014/0236356 A1 | 8/2014 | Kuwahara |
| 2014/0236565 A1 | 8/2014 | Kuwahara |
| 2014/0277737 A1 | 9/2014 | Sekiyama et al. |
| 2015/0239121 A1 | 8/2015 | Takeda |
| 2015/0290801 A1 | 10/2015 | Kuwahara |
| 2015/0328776 A1 | 11/2015 | Shiratsuchi |
| 2015/0379171 A1 | 12/2015 | Kuwahara |
| 2018/0036882 A1 | 2/2018 | Kimura |
| 2019/0143524 A1 | 5/2019 | Takahashi et al. |
| 2019/0314989 A1 | 10/2019 | Sokabe et al. |

FOREIGN PATENT DOCUMENTS

| | | |
|---|---|---|
| CN | 104875203 | 9/2015 |
| CN | 105269565 | 1/2016 |
| CN | 105437232 | 3/2016 |
| CN | 109746928 | 5/2019 |
| CN | 109760042 | 5/2019 |
| DE | 102012103830 | 11/2012 |
| EP | 1901151 | 3/2008 |
| JP | S61-250707 | 11/1986 |
| JP | H5-250023 | 9/1993 |
| JP | H8-166809 | 6/1996 |
| JP | H8-328632 | 12/1996 |
| JP | H9-085655 | 3/1997 |
| JP | H11-254379 | 9/1999 |
| JP | 2001-216015 | 8/2001 |
| JP | 2003-091304 | 3/2003 |
| JP | 2005-149016 | 6/2005 |
| JP | 2005-297097 | 10/2005 |
| JP | 2006-190228 | 7/2006 |
| JP | 2007-512153 | 5/2007 |
| JP | 2008-502488 | 1/2008 |
| JP | 4103057 | 6/2008 |
| JP | 2013-212517 | 10/2013 |
| JP | 2015-160277 | 9/2015 |
| JP | 2015-202523 | 11/2015 |
| JP | 2018-020410 | 2/2018 |
| JP | 2018-020423 | 2/2018 |
| JP | 2019-084664 | 6/2019 |
| WO | 2005/049284 | 6/2005 |
| WO | 2005/124486 | 12/2005 |
| WO | 2014/122995 | 8/2014 |
| WO | 2018/143003 | 8/2018 |

OTHER PUBLICATIONS

International Search Report dated Dec. 8, 2020 for PCT/JP2020/040842.
Office Action issued in U.S. Appl. No. 15/898,663, dated Jun. 2, 2020.
Office Action issued in U.S. Appl. No. 15/898,663, dated Nov. 30, 2020.
Office Action issued in U.S. Appl. No. 15/898,663, dated Jun. 24, 2021.
Office Action issued in European Patent Application No. 18157102.7, dated Mar. 1, 2021.
Office Action issued in Japanese Patent Application No. P2017-030276, dated Dec. 3, 2019 (with English partial translation).
Office Action issued in Japanese Patent Application No. P2017-030276, dated Feb. 2, 2021 (with English partial translation).
Office Action issued in Chinese Patent Application No. 201810141614.X, dated Mar. 31, 2021 (with English partial translation).
Office Action issued in Japanese Patent Application No. P2019-214768 dated Mar. 10, 2020 (with English partial translation).
Office Action issued in Japanese Patent Application No. P2019-214768, dated Jun. 30, 2020 (with English partial translation).
Office Action issued in Japanese Patent Application No. P2017-030276, dated Jun. 30, 2020 (with English partial translation).
Extended Search Report in corresponding European Application No. 18157102.7, dated Jul. 27, 2018.
International Preliminary Report on Patentability with Written Opinion dated Jun. 9, 2022 for PCT/JP2020/040842.
Office Action issued in Chinese Patent Application No. 202080081280.7, dated Jan. 30, 2024 (with English partial translation).
SOEI Patent and Law Firm, Statement of Related Matters, dated Jul. 8, 2022.

INTERFERENCE CHECK FOR ROBOT OPERATION

CROSS-REFERENCE TO RELATED APPLICATIONS

This application is a continuation application of PCT Application No. PCT/JP2020/040842, filed on Oct. 30, 2020, which claims the benefit of priority from Japanese Patent Application No. 2019-214768, filed on Nov. 27, 2019, the entire contents of which are incorporated herein by reference.

BACKGROUND

International Publication No. WO 2018/143003 describes a robot path generation device that generates a path of a robot between a start point and an end point arbitrarily set based on a result of a machine learning process based on a data set.

SUMMARY

A simulation system according to an aspect of the present disclosure includes circuitry configured to: determine placement of a robot with respect to another object in a virtual space, based on a placement constraint applied to the robot for executing a plurality of tasks; generate a path representing a trajectory of at least a portion of the robot or a tool operated by the robot during the tasks executed by the robot, based on a spatial relationship between the determined placement of the robot and the other object that satisfies the placement constraint; execute an operation program including the generated path in the virtual space in which the robot and the other object are placed; check whether the robot interferes with the other object, based on the spatial relationship between the determined placement of the robot and the other object along the generated path in the virtual space, as a result of executing the tasks in the operation program; adjust the placement of the robot in the operation program that satisfies the placement constraint, in response to detecting interference between the robot and the other object; generate an adjusted path in the operation program based on the adjusted placement of the robot relative to the other object; and output the operation program including the tasks and the adjusted path, in response to confirming there is no interference between the robot and the other object along the adjusted path in the virtual space.

A simulation system according to another aspect of the present disclosure includes circuitry configured to: determine a plurality of tasks based on a task constraint applied to the task executed by a robot; generate a path representing a trajectory of at least a portion of the robot or a tool operated by the robot during the determined tasks executed by the robot; execute an operation program including the generated path in a virtual space in which the robot and another object are placed; check whether the robot interferes with the other object, based on the determined tasks, as a result of executing the determined tasks in the operation program; adjust at least part of the tasks in the operation program that satisfies the task constraint, in response to detecting interference between the robot and the other object; generate an adjusted path in the operation program based on the adjusted tasks; and output the operation program including the adjusted tasks and the adjusted path, in response to confirming there is no interference between the robot and the other object along the adjusted path in the virtual space.

DETAILED DESCRIPTION

In the following description, with reference to the drawings, the same reference numbers are assigned to the same components or to similar components having the same function, and overlapping description is omitted.

Robot System

Figure 1:
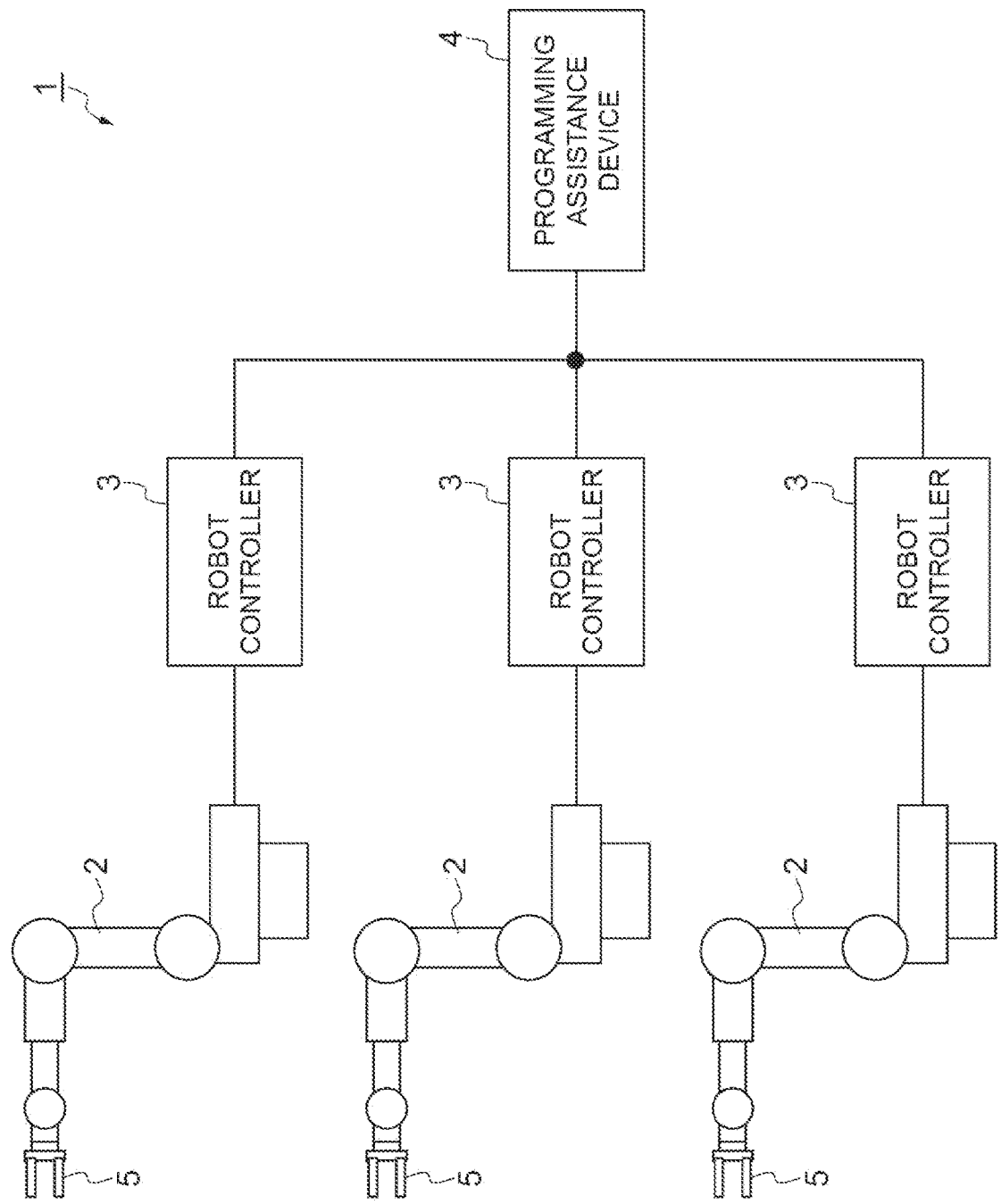
FIG. 1 is a diagram showing an example configuration of a robot system.

In some examples, the simulation system according to the present disclosure is applied to a programming assistance device 4 of a robot system 1. The robot system 1 is a system that automates various works such as machining and assembly by causing a robot to execute an operation taught by an operator. FIG. 1 is a diagram showing an example configuration of a robot system. In some examples, the robot system 1 comprises one or more robots 2, one or more robot controllers 3 corresponding to the one or more robots 2, and the programming assistance device 4. FIG. 1 shows three robots 2 and three robot controllers 3, and shows a configuration in which one robot 2 is connected to one robot controller 3. In some examples, a plurality of the robot 2 may be connected to one controller robot 3.

In some examples, the robot 2 is a multi-axis serial link type vertical articulated robot, and is configured to be able to execute various processes in a state in which a tool is held in a tip portion 5. The robot 2 is able to freely change the position and posture of the tip portion 5 within a predetermined range. The robot 2 may be a 6-axis vertical articulated robot, or a 7-axis vertical articulated robot in which one redundant axis is added to six axes. In some examples, a plurality of the robots 2 are placed such that any robot 2 is able to execute the same process on the same workpiece placed at the same position.

The robot controller 3 is a device that controls the robot 2 according to a previously generated operation program. In some examples, the operation program includes data for controlling the robot 2, and includes, for example, placement of the robot 2, tasks to be executed by the robot 2, and a path between tasks. The operation program may data including various target values related to the control of the robot 2. In some examples, the robot controller 3 calculates a joint angle target value (angle target value of each joint of the robot 2) for matching the position and posture of the tip portion 5 to the target value indicated by the operation program, and controls the robot 2 in accordance with the angle target value.

The "placement" refers to at least a position of the robot 2 in a workspace, and may further mean at least one of an orientation and a posture of the robot 2 in the position.

Under the control of the robot controller 3, the robot 2 executes a series of processes. The "task" refers to a process of a minimum unit constituting the series of processes. Examples of tasks include "take a component", "place a component", "fit a component (to workpiece)", "take a standby posture", etc., but it should be noted that tasks may be set in any manner. One task may include a work path that is a trajectory of the robot 2 in the task. The trajectory of the robot 2 refers to a route of motion of the robot 2 or a component thereof. For example, the trajectory of the robot 2 may be a trajectory of the tip portion 5. In some examples, the work path is set based on a user input when generating a task. That is, the work path is set manually.

The path refers to a trajectory of the robot 2 that connects tasks. More specifically, the end point of a work path (first work path) in a preceding task (first task) is connected to the start point of a work path (second work path) in a subsequent task (second task). In the present disclosure, a path between tasks is also referred to as an "air-cut path" to be distinguished from the work path. The path between tasks is automatically set, and, for example, the path is automatically set by automatically setting teaching points other than the start and end points. The teaching point refers to a reference point set to define a path.

The programming assistance device 4 is a device that assists the generation of the operation program. The programming assistance device 4 generates the operation program by determining, for each of one or more robots 2, placement, a configuration of a task, and a path between tasks, and simulates whether there is a problem in control based on the operation program. The simulation refers to a process of virtually executing the operation program, and more specifically, refers to a process of simulatively executing the operation program on a computer without actually operating the robot 2. To be more specific, the simulation is a process of virtually executing the operation program in a virtual space in which the robot 2 and another object are placed. The other object is an object placed around the robot 2, and may be, for example, another robot 2, a workpiece, another manufacturing apparatus, and the like.

Programming Assistance Device

Figure 2:
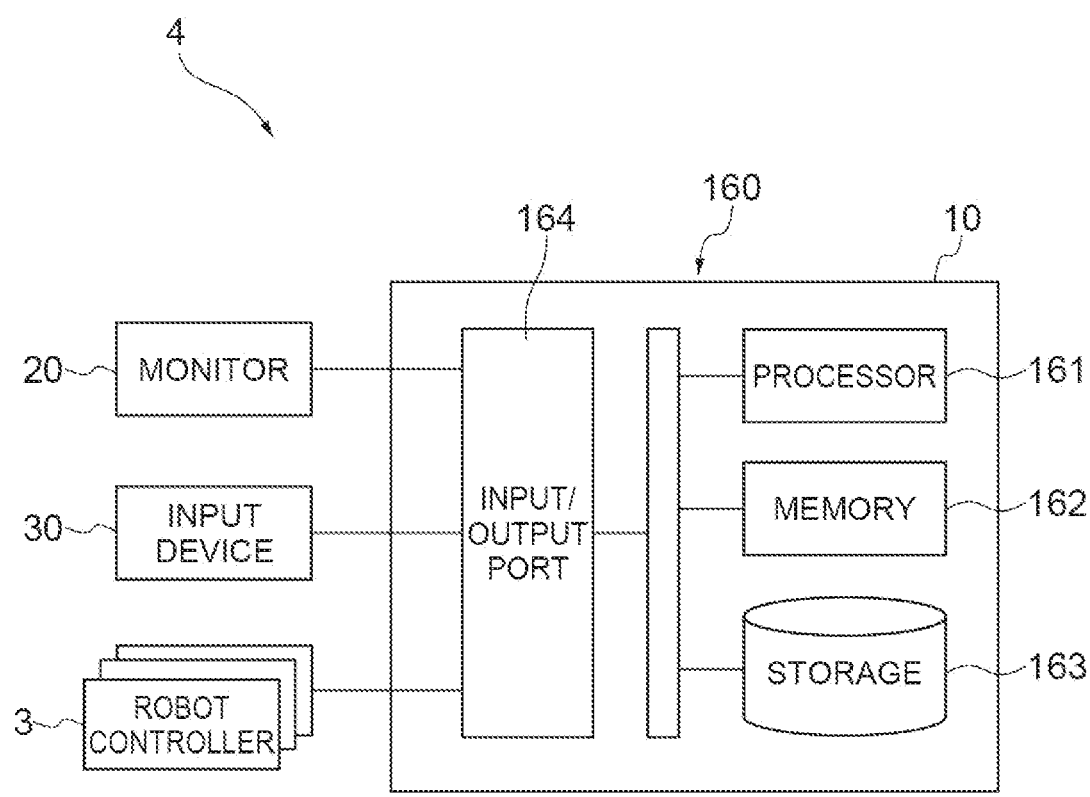
FIG. 2 is a diagram showing an example hardware configuration of a programming assistance device.

FIG. 2 is a diagram showing an example hardware configuration of the programming assistance device 4. Programming assistance device 4 includes a body 10, a monitor 20, and an input device 30.

The body 10 is constituted by at least one computer. The body 10 includes circuitry 160, and the circuitry 160 includes at least one processor 161, a memory 162, a storage 163, and an input/output port 164. The storage 163 stores a program for configuring each functional module of the body 10. The storage 163 is a computer-readable recording medium such as a hard disk, a nonvolatile semiconductor memory, a magnetic disk, or an optical disk. The memory 162 temporarily stores a program loaded from the storage 163, an operation result of the processor 161, and the like. The processor 161 configures each functional module by executing the program in cooperation with the memory 162. The input/output port 164 inputs and outputs electric signals between the monitor 20, the input device 30, and the robot controller 3 in response to commands from the processor 161.

The monitor 20 is a device for displaying information output from the body 10. The monitor 20 may be any unit as long as graphic display is possible, and specific examples thereof include a liquid crystal panel. The input device 30 is a device for inputting information to the body 10. The input device 30 may be any unit as long as desired information is able to be input, and specific examples thereof include a keypad and a mouse.

The monitor 20 and the input device 30 may be integrated as a touch panel. For example, the body 10, the monitor 20, and the input device 30 may be integrated like tablet computers.

Figure 3:
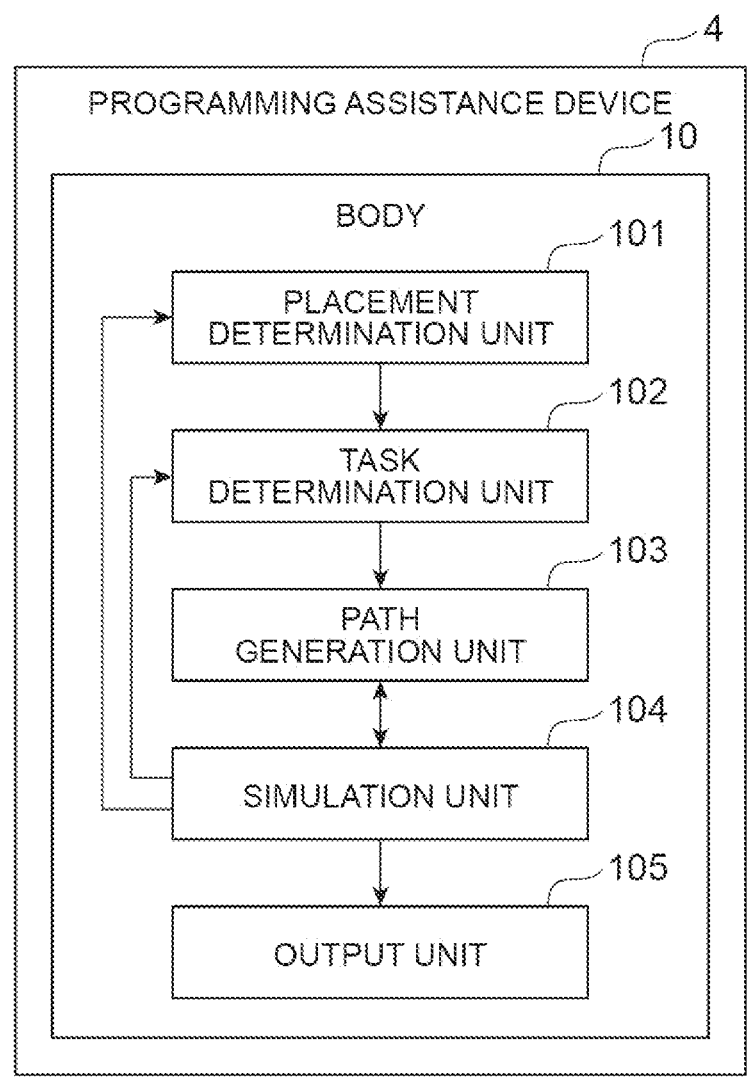
FIG. 3 is a diagram showing an example functional configuration of the programming assistance device.

FIG. 3 is a diagram showing an example functional configuration of the programming assistance device 4. In some examples, the programming assistance device 4 comprises a placement determination unit 101, a task determination unit 102, a path generation unit 103, a simulation unit 104, and an output unit 105 as functional modules. The placement determination unit 101 is a functional module that determines the placement of one or more robots 2 in a workspace. Task determination unit 102 is a functional module that determines one or more tasks for each robot 2. The path generation unit 103 is a functional module that generates a path (air-cut path) between tasks for each robot 2. The simulation unit 104 is a functional module that virtually executes each operation program and checks whether there is a problem in the operation program. In some examples, the simulation unit 104 determines whether the robot 2 interferes with another object in the simulation, and thus may also function as an interference check unit. In the present disclosure, the interference refers to contact or collision between objects, and more specifically, refers to contact or collision of the robot 2 with another object. In some examples, the simulation unit 104 checks whether the execution of task succeeds, and thus may also function as a task check unit. The output unit 105 is a functional module that outputs the result of the simulation.

Simulation Method

Figure 4:
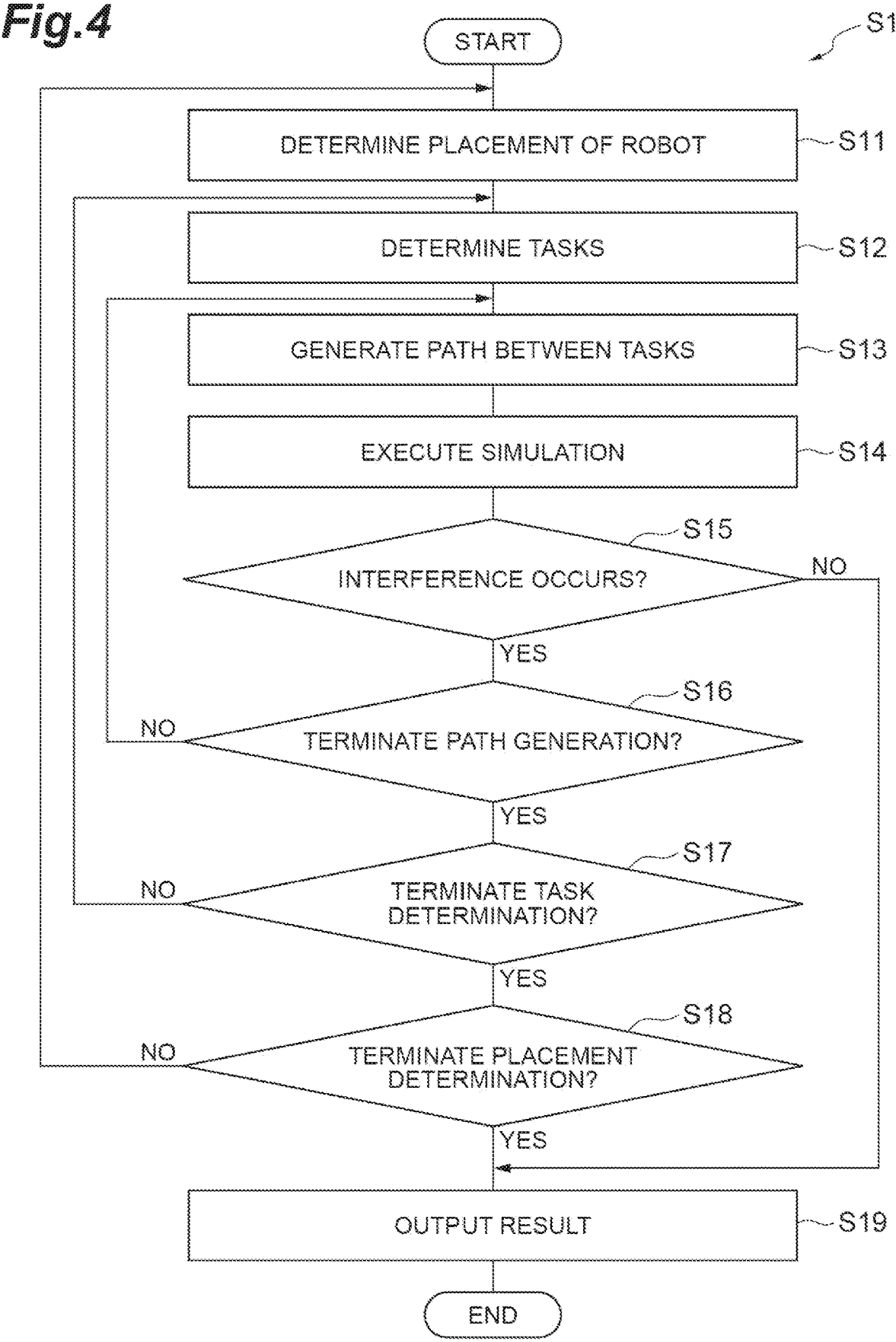
FIG. 4 is a flowchart showing an example operation of the programming assistance device.

As an example of the simulation method according to the present disclosure, an example of a series of procedures executed by the programming assistance device 4 will be described with reference to FIG. 4. FIG. 4 is a flowchart showing an example operation of the programming assistance device 4 as processing flow S1. That is, the programming assistance device 4 executes the processing flow S1. In the processing flow S1, it is assumed that the simulation unit 104 determines whether the interference occurs.

In step S11, the placement determination unit 101 determines the placement of the robot. In some examples, the placement determination unit 101 determines the placement of the robot 2 based on a placement constraint related to the robot 2. The placement constraint refers to a requirement that have to be satisfied in a case where one or more robots 2 are placed in the workspace. The placement constraint is applied to the robot 2 for executing a plurality of tasks. For example, the placement constraint may include a position or area in which each robot 2 is to be placed. A placement constraint that randomly places the robot 2 may be used.

The placement determination unit 101 may acquire the placement constraint in any manner. For example, the placement determination unit 101 may receive the placement constraint input by a user operation, read the placement constraint stored in advance in the storage 163, or receive the placement constraint transmitted from another computer system. Alternatively, the placement determination unit 101 may automatically or semi-automatically generate the placement constraint based on data acquired by two or more methods.

The placement determination unit 101 determines placement of one or more robots 2 based on the placement constraint. The placement determination unit 101 may place each robot 2 according to the placement constraint as it is, and for example, may place the robot 2 at a position designated by a user operation. Alternatively, the placement determination unit 101 may place each robot 2 by applying the placement constraint to a previously prepared algorithm.

In step S12, the task determination unit 102 determines tasks for each robot 2. In some examples, the task determination unit 102 determines at least one task for each robot 2 based on a task constraint related to tasks. The task constraint refers to a requirement that have to be satisfied in a case where the robot 2 executes a task. In some examples, the task constraint may include at least one of a before-and-after relationship between a plurality of tasks, a corresponding relationship between a type of the robot 2 and an executable task, and an interlock. The interlock refers to a mechanism for executing a next operation only when a given condition is satisfied. The task constraint may include at least one of a requirement set individually for each robot 2 and a requirement set in common for one or more robots 2.

The task determination unit 102 may acquire the task constraint in any manner. For example, the task determination unit 102 may receive the task constraint input by a user operation, read the task constraint stored in advance in the storage 163, or receive the task constraint transmitted from another computer system. Alternatively, the task determination unit 102 may automatically or semi-automatically generate the task constraint based on data acquired by two or more methods.

The task determination unit 102 determines one or more tasks for each of one or more robots 2 based on the task constraint. In some examples, determining a task refers to determining a task configuration based on one or more tasks. For example, the task configuration may include at least one of an execution order and an execution timing of each task. The task determination unit 102 may determine a task of each robot 2 according to the task constraint as it is, and for example, may set the task, the executing order, and the executing timing designated by a user operation as they are. Alternatively, the task determination unit 102 may determine one or more tasks for each robot 2 by applying the task constraint to a previously prepared algorithm. The task determination unit 102 may determine a task of a certain robot 2 in consideration of tasks of another robot 2. The task determination unit 102 may determine one or more tasks further based on a relationship between the placement of the robot 2 and another object. Such a relationship may be a spatial relationship between the placement of the robot 2 and the other object that satisfies the placement constraint.

In step S13, the path generation unit 103 generates a path (air-cut path) between tasks. In some examples, the path generation unit 103 generates a path so as to avoid interference between the robot 2 and another object, by using model data stored in the storage 163. The path generation unit 103 may generate the path based on a relationship between the placement of the robot 2 and another object.

In detail, the path generation unit 103 generates one or more via points to avoid interference between the robot 2 and another object, between the end point of the work path in a preceding task and the start point of the work path in a subsequent task. The path generation unit 103 generates a path (air-cut path) so as to sequentially pass through the one or more via points. In order to generate one path, the path generation unit 103 may repeatedly execute a series of processes including setting of via points and checking the avoidance of interference. Details of such a generation method are described in, for example, JP 4103057 B. For example, in a case where a certain robot 2 repeatedly executes a task Ta and a task Tb in this order, the path generation unit 103 generates a path from the task Ta to the task Tb and a path from the task Tb to the task Ta. In a case where there is only one task with respect to a certain robot 2, the path generation unit 103 may generate a path connecting the end point of the work path of the task and the start point of the work path of the task, as a path between tasks. The path generation unit 103 generates a path between tasks for each of one or more robots 2, whereby the operation program of each robot 2 is provisionally determined. In some examples, the operation program includes an entire path representing a trajectory of at least a portion of the robot 2 or a tool operated by the robot 2 during the tasks executed by the robot 2. In some examples, the entire path may include, at least, two work paths and one air-cut path connecting the two work paths.

In step S14, the simulation unit 104 executes simulation for each operation program of one or more robots 2. The simulation unit 104 executes the operation program of each robot 2 at a predetermined timing and determines whether the robot 2 interferes with another object in each operation program. Since the simulation unit 104 virtually executes the operation program, a plurality of interferences may be detected with respect to one operation program (i.e., one robot 2). In some examples the simulation unit 104 check whether the robot 2 interferes with another object, based on the spatial relationship between the determined placement of the robot 2 and the other object along the generated path in the virtual space.

In step S15, the simulation unit 104 determines whether interference occurs in each operation program. In a case where the interference occurs, the simulation unit 104 detects the interference. If no interference occurs, that is, in a case where the simulation unit 104 confirms there is no interference in any operation program (the robot 2) (NO in step S15), the process proceeds to step S19, which will be described later.

On the other hand, if at least one interference occurs (i.e., if the simulation unit 104 detects the interference) (YES in step S15), the programming assistance device 4 executes the process again from any one of the path generation, the task determination, and the placement determination in order to search for an operation program in which interference does not occur. In some examples, the programming assistance device 4 first retries the path generation. If that retry is unable to avoid interference, the programming assistance device 4 then retries the processing from the task determination. If the repeated task determination is unable to avoid interference, the programming assistance device 4 then retries the processing from the placement determination. Steps S16 to S18 shows examples of such retries.

In step S16, the simulation unit 104 determines whether to terminate the path generation. The condition of the termination may be defined by, for example, a maximum number of attempts or a timeout period. The maximum number of attempts may be one, or two or more.

In a case of not terminating the path generation with respect to the current placement and tasks of each robot 2 (NO in step S16), the process returns to step S13. In step S13, the path generation unit 103 regenerates a path between tasks while maintaining the current placement and tasks of each robot 2. That is, the path generation unit 103 adjusts the path (i.e., generates an adjusted path), in response to detecting the interference in the operation program. The adjusting the path (or the generating the adjusted path) refers to changing at least part of the path. For example, the path generation unit 103 may adjust part of the current path. Alternatively, the path generation unit 103 may adjust the whole of the current path, and for example, may discard the current path and generate another path from scratch. For example, the path generation unit 103 may adjust only a path in which interference occurs or may adjust a plurality of paths including such a path. In a case where a plurality of operation programs (i.e., a plurality of the robot 2) are simulated, the path generation unit 103 may adjust a path only for a first operation program (a first robot 2) in which interference occurs, or may adjust a path for a second operation program (a second robot 2) in addition to the first operation program.

In a case of terminating the path generation with respect to the current placement and tasks (YES in step S16), the process proceeds to step S17. In step S17, the simulation unit 104 determines whether to terminate the task determination. The condition of this termination may be defined by, for example, a maximum number of attempts or a timeout period. The maximum number of attempts may be one, or two or more.

In a case of not terminating the task determination with respect to the current placement of each robot 2 (NO in step S17), the processing returns to step S12. In step S12, the task determination unit 102 determines tasks of each robot 2 again while maintaining the current placement of each robot 2. That is, the task determination unit 102 adjusts at least part of a plurality of tasks in response to detecting the interference in the operation program. The adjusting a task refers to changing at least part of the configuration of a plurality of tasks. For example, the task determination unit 102 may adjust part of the current task configuration, or may discard the current task configuration and determine tasks from scratch. For example, the task determination unit 102 may adjust only the task included in a first operation program in which interference occurs, or may adjust a task in a second operation program in addition to the first operation program. The task determination unit 102 may adjust a target task based on at least one of a user operation and a predetermined algorithm. In repeated step S13, the path generation unit 103 generates an adjusted path in the operation program based on the adjusted tasks.

In a case of terminating the task determination with respect to the current placement (YES in step S17), the process proceeds to step S18. In step S18, the simulation unit 104 determines whether to terminate the placement determination. The condition of this termination may be defined by, for example, a maximum number of attempts or a timeout period. The maximum number of attempts may be one, or two or more.

In a case of not terminating the placement determination (NO in step S18), the process returns to step S11. In step S11, the placement determination unit 101 again determines the placement of at least one robot 2. That is, the placement determination unit 101 adjusts at least part of the placement of the robot 2 in response to detecting the interference in the operation program. The adjusting the placement refers to changing at least part of the placement of the robot 2, and for example, changing at least one of position, orientation, and posture. For example, the placement determination unit 101 may adjust part of the current placement, or may discard the current placement and determine the placement from scratch. For example, the placement determination unit 101 may adjust only the placement of a first robot 2 in which interference occurs, or may adjust the placement of a second robot 2 in addition to the first robot 2. The placement determination unit 101 may adjust the placement of a target robot 2 based on at least one of a user operation and a predetermined algorithm. In repeated step S12, the task determination unit 102 adjusts at least part of the determined tasks. In repeated step S13, the path generation unit 103 generates an adjusted path in the operation program based on the adjusted placement and the adjusted tasks.

In a case of terminating the placement determination (YES in step S18), the process proceeds to step S19.

In step S19, the output unit 105 outputs result data indicating a result of the simulation. In some examples, the result data may include an operation program of each robot 2. The output unit 105 may output an operation program in which it is confirmed through the simulation that interference does not occur. In a case where the placement determination is terminated, the output unit 105 outputs an operation program having a possibility of interference. The result data may include other information in addition to or instead of the operation program. For example, the result data may include interference information regarding interference that could not be resolved. For example, the interference information may indicate in which the robot 2, task, or path the interference occurred, or may indicate at least one of the timing and position at which the interference occurred.

The output unit 105 may display the result data on the monitor 20, may store the result data in a recording medium such as the storage 163, or may transmit the result data to another computer such as the robot controller 3. In case of displaying the result data on the monitor 20, the output unit 105 may represent the operation of the robot 2 based on the operation program with moving image or a still image by computer graphics (CG), in response to a user operation or automatically.

In some examples, the output unit 105 outputs, to the robot controller 3, an operation program that is confirmed through the simulation that interference does not occur, and the robot controller 3 controls the robot 2 based on the operation program. Accordingly, at least one of the output unit 105 and the robot controller 3 may function as a control unit. Each robot controller 3 controls the robot 2 in accordance with the operation program of the robot controller 3, and each robot 2 executes predetermined processing without causing interference in the workspace. Since the robot 2 that operates based on the operation program is obtained by the processing flow S1, the processing flow S1 is an example of the simulation method according to the present disclosure and is also an example of the method for manufacturing a robot according to the present disclosure.

In some examples, the robot 2 may be a mobile robot capable of moving by itself. In this case, the robot 2 may move in the workspace to a predetermined position in accordance with the operation program, prior to starting the operation. For example, the robot 2 is capable of running by itself and move with respect to another object. This robot 2 may repeatedly execute a series of processes (i.e., at least one task) indicated by the operation program in the placement indicated by the operation program.

As shown in the processing flow S1, in some examples, the programming assistance device 4 adjust the path (i.e., generates a pre-adjusted path) in repeated step S13 while maintaining the determined placement of the robot 2, before adjusting the placement of the robot 2 in repeated step S11. In repeated step S14, the programming assistance device 4 executes the operation program including the pre-adjusted path in the virtual space. In that step S14, the programming assistance device 4 checks whether the robot 2 interferes with another object, based on the spatial relationship between the determined placement of the robot 2 and the other object along the pre-adjusted path in the virtual space. The programming assistance device 4 adjusts the placement of the robot 2 in repeated step S11, in response to detecting an interference between the robot 2 and the other object on the pre-adjusted path.

As shown in the processing flow S1, in some examples, the programming assistance device 4 adjust the path (i.e., generates a pre-adjusted path) in repeated step S13 while maintaining the determined tasks, before adjusting the tasks in repeated step S12. In repeated step S14, the programming assistance device 4 executes the operation program including the pre-adjusted path in the virtual space. In that step S14, the programming assistance device 4 checks whether the robot 2 interferes with another object, based on the determined tasks. The programming assistance device 4 adjusts the tasks in repeated step S12, in response to detecting the interference between the robot 2 and the other object on the pre-adjusted path.

Figure 5:
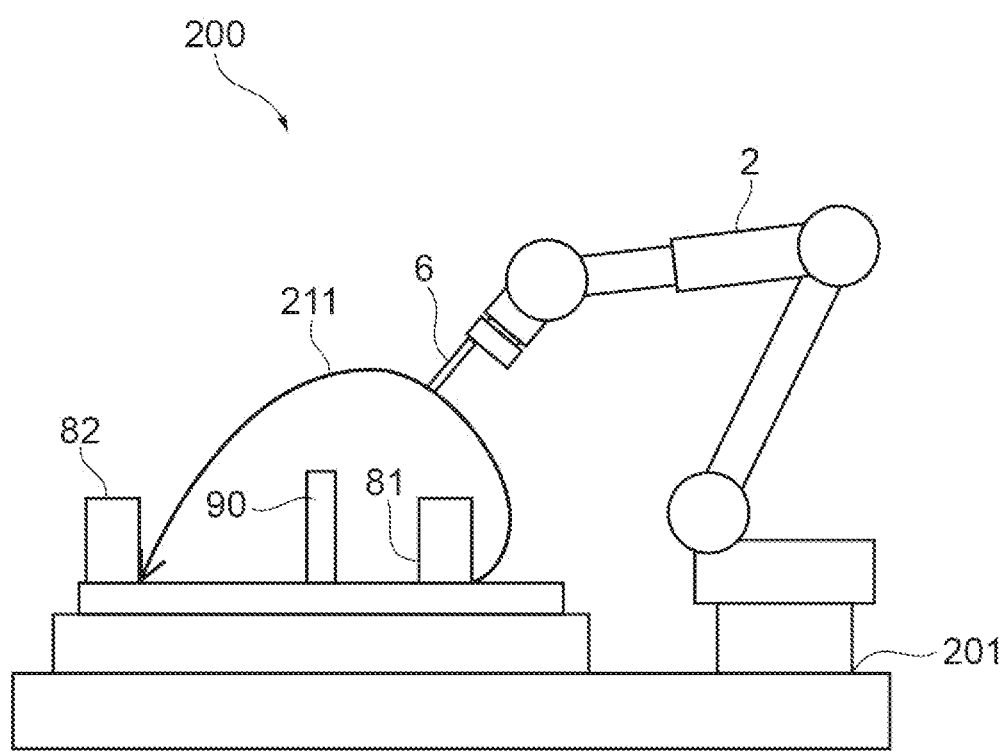
FIG. 5 is a diagram showing an example path generated by the programming assistance device.

FIG. 5 is a diagram showing an example path generated by the programming assistance device 4. FIG. 5 shows a virtual space 200 including a robot 2 holding a tool 6, two workpieces 81 and 82, and an obstacle 90. The workpieces 81 and 82 are components to be processed by the robot 2. The obstacle 90 may be referred to as "another object" for which interference with robot 2 and tool 6 is determined.

As an illustrative example, the programming assistance device 4 places the robot 2 at a position 201 in the virtual space 200 based on a placement constraint, and determines a preceding task (first task) corresponding to the workpiece 81 and a subsequent task (second task) corresponding to the workpiece 82 based on one or more task constraints. The programming assistance device 4 generates a path (air-cut path) 211 between the preceding task and the subsequent task. The path 211 indicates a trajectory of the robot 2 (or the tool 6) from the preceding task to the subsequent task. In some examples, the tool 6 may be considered part of the robot 2. The programming assistance device 4 executes simulation for an operation program including the path 211, and determines whether the robot 2 and/or the tool 6 interfere with the obstacle 90 in the operation program. In this example, since the tool 6 traveling along the path 211 does not interfere with the obstacle 90, the programming assistance device 4 outputs the operation program including the path 211.

In a case where a path between the preceding task and the subsequent task indicates an interference with the obstacle 90, the programming assistance device 4 adjusts the path to generate an adjusted path. In some examples, the programming assistance device 4 executes the path adjustment while maintaining the preceding task and the subsequent task. In some examples, the programming assistance device 4 executes the path adjustment while maintaining the placement of robot 2 (i.e., while maintaining the position 201 of the base of the robot 2). In some examples, the programming assistance device 4 adjusts at least part of the preceding task and the subsequent task and generates an adjusted path based on the adjusted preceding or subsequent task. In some examples, the programming assistance device 4 adjusts the placement of robot 2 (i.e., moves the base of the robot 2 from the position 201 to another position) and generates an adjusted path of the tool 6 between tasks executed by the robot 2 in the adjusted placement.

Program

Each functional module of the programming assistance device 4 is realized by reading a simulation program on the processor 161 or the memory 162 and causing the processor 161 to execute the program. The simulation program includes codes for realizing each functional module of the programming assistance device 4. The processor 161 operates the input/output port 164 according to the simulation program, and reads and writes data in the memory 162 or the storage 163. Such processing realizes each functional module of the programming assistance device 4.

The simulation program may be provided after being fixedly stored on a non-transitory storage medium such as a CD-ROM, a DVD-ROM, or a semiconductor memory. Alternatively, the simulation program may be provided via a communication network as data signals superimposed on carrier waves.

As described above, a simulation system according to an aspect of the present disclosure includes circuitry configured to: determine placement of a robot with respect to another object in a virtual space, based on a placement constraint applied to the robot for executing a plurality of tasks; generate a path representing a trajectory of at least a portion of the robot or a tool operated by the robot during the tasks executed by the robot, based on a spatial relationship between the determined placement of the robot and the other object that satisfies the placement constraint; execute an operation program including the generated path in the virtual space in which the robot and the other object are placed; check whether the robot interferes with the other object, based on the spatial relationship between the determined placement of the robot and the other object along the generated path in the virtual space, as a result of executing the tasks in the operation program; adjust the placement of the robot in the operation program that satisfies the placement constraint, in response to detecting interference between the robot and the other object; generate an adjusted path in the operation program based on the adjusted placement of the robot relative to the other object; and output the operation program including the tasks and the adjusted path, in response to confirming there is no interference between the robot and the other object along the adjusted path in the virtual space.

According to such an example, an operation program capable of appropriately controlling the robot is output by a series of processes including the placement of the robot, the path generation, and the simulation. Since there is a dependency relationship between the placement of the robot and the path, the dependency relationship can be optimized by verifying both of them by the simulation. As a result, further automation in the planning of robot control is possible. In some examples, by repeating the simulation in this manner, an appropriate path can be automatically set. In some examples, the robot control can be appropriately planned by retrying from the robot placement located upstream of the path generation. In this case, by retrying from placing in a case where a solution cannot be obtained by the path generation, it is possible to plan robot control efficiently while reducing the amount of processing of the simulation system.

In some examples, the circuitry may be further configured to, before adjusting the placement of the robot: generate a pre-adjusted path while maintaining the determined placement of the robot; execute the operation program including the pre-adjusted path in the virtual space; and check whether the robot interferes with the other object, based on the spatial relationship between the determined placement of the robot and the other object along the pre-adjusted path in the virtual space. By repeating the simulation in this manner, an appropriate path can be obtained more efficiently.

In some examples, the circuitry may be configured to adjust the placement of the robot, in response to detecting an interference between the robot and the other object on the pre-adjusted path. By repeating the simulation in this manner, an appropriate path can be automatically set.

In some examples, the circuitry may be further configured to execute the operation program including the adjusted path in the virtual space, in order to confirm whether there is interference between the robot and the other object along the adjusted path.

In some examples, the tasks may include a first task and a second task that is performed subsequent to the first task, and the circuitry may be configured to generate, as at least part of the path, an air-cut path between the first task and the second task. In this case, an operation program including an appropriate air-cut path can be obtained automatically.

In some examples, the first task may include a first work path set by a user input, the second task may include a second work path set by the user input, and the circuitry may be configured to generate the air-cut path so as to connect the first work path and the second work path.

In some examples, the circuitry may be configured to generate the air-cut path so as to avoid the interference between the robot and the other object between the first task and the second task. In this case, an operation program including an appropriate air-cut path can be obtained automatically.

In some examples, the circuitry may be further configured to: determine the tasks based on a task constraint applied to the tasks executed by the robot; generate the path including the trajectory of the portion of the robot or the tool that is executing the determined tasks; and generate the adjusted path including the trajectory of the portion of the robot or the tool that is executing the determined tasks. An operation program capable of appropriately controlling the robot is output by a series of processes including the placement of the robot, the task determination, the path generation, and the simulation. Since there is a dependency relationship among the placement of the robot, the task, and the path, the dependency relationship can be optimized by verifying them by the simulation. As a result, further automation in the planning of robot control is possible.

In some examples, the circuitry may be configured to determine the tasks further based on the spatial relationship between the determined placement of the robot and the other object. An optimum task can be determined by considering a relationship between the placement of the robot and the other object.

In some examples, the circuitry may be configured to further check whether the robot is able to execute the determined tasks, based on the spatial relationship between the determined placement of the robot and the other object, as the result of executing the determined tasks in the operation program. In this case, it is possible to verify by the simulation whether the series of tasks can be appropriately executed.

In some examples, the circuitry may be configured to: adjust at least part of the determined tasks in response to detecting the interference between the robot and the other object; and generate the adjusted path further based on the adjusted tasks. The robot control can be appropriately planned by retrying from the task determination located upstream of the path generation. In this case, by retrying from the task determination in a case where a solution cannot be obtained by the path generation, it is possible to plan robot control efficiently while reducing the amount of processing of the simulation system.

In some examples, the robot may be a mobile robot capable of moving by itself with respect to the other object, and at least one of the tasks may cause the mobile robot to move to a position corresponding to the adjusted placement. In this case, the planning of the control of the mobile robot can be further automated.

In some examples, at least one of the tasks may be repeatedly executed by the mobile robot at the position corresponding to the adjusted placement. In this case, it is possible to further automate the planning of the control of the mobile robot that repeatedly performs processing at a specific position.

In some examples, the circuitry may be further configured to control the robot based on the operation program. In this case, it is possible to control the robot more efficiently.

In some examples, the circuitry may be further configured to output the operation program to a robot controller to cause the robot controller to control the robot.

A simulation system according to another aspect of the present disclosure includes circuitry configured to: determine a plurality of tasks based on a task constraint applied to the task executed by a robot; generate a path representing a trajectory of at least a portion of the robot or a tool operated by the robot during the determined tasks executed by the robot; execute an operation program including the generated path in a virtual space in which the robot and another object are placed; check whether the robot interferes with the other object, based on the determined tasks, as a result of executing the determined tasks in the operation program; adjust at least part of the tasks in the operation program that satisfies the task constraint, in response to detecting interference between the robot and the other object; generate an adjusted path in the operation program based on the adjusted tasks; and output the operation program including the adjusted tasks and the adjusted path, in response to confirming there is no interference between the robot and the other object along the adjusted path in the virtual space.

According to such an example, an operation program capable of appropriately controlling the robot is output by a series of processes including the task determination, the path generation, and the simulation. Since there is a dependency relationship between the task and the path, the dependency relationship can be optimized by verifying both of them by the simulation. As a result, further automation in the planning of robot control is possible. In some examples, by repeating the simulation in this manner, an appropriate path can be automatically set. In some examples, the robot control can be appropriately planned by retrying from the task determination located upstream of the path generation. In this case, by retrying from the task determination in a case where a solution cannot be obtained by the path generation, it is possible to plan robot control efficiently while reducing the amount of processing of the simulation system.

In some examples, the circuitry may be further configured to, before adjusting the tasks: generate a pre-adjusted path while maintaining the determined tasks; execute the operation program including the pre-adjusted path in the virtual space; and check whether the robot interferes with the other object, based on the determined tasks. By repeating the simulation in this manner, an appropriate path can be obtained more efficiently.

In some examples, the circuitry may be configured to adjust the tasks, in response to detecting the interference between the robot and the other object on the pre-adjusted path. By repeating the simulation in this manner, an appropriate path can be automatically set.

In some examples, the circuitry may be further configured to execute the operation program including the adjusted path in the virtual space, in order to confirm whether there is interference between the robot and the other object along the adjusted path.

In some examples, the determined tasks include a first task and a second task performed subsequent to the first task, and the circuitry may be configured to generate, as at least a part of the path, an air-cut path between the first task and the second task. In this case, an operation program including an appropriate air-cut path can be obtained automatically.

Additional Examples

It is to be understood that not all aspects, advantages and features described herein may necessarily be achieved by, or included in, any one particular example. Indeed, having described and illustrated various examples herein, it should be apparent that other examples may be modified in arrangement and detail is omitted.

In the processing flow S1, the simulation unit 104 determines whether the interference occurs, but as described above, the simulation unit 104 may check whether the execution of the task succeeds, instead of or in addition to the check of interference.

In the above examples, the programming assistance device 4 includes both the placement determination unit 101 and the task determination unit 102, but one of these two functional modules may be omitted in the simulation system. For example, the simulation system may not include the placement determination unit in a case where the placement of robot has been already determined, and the simulation system may not include the task determination unit in a case where the tasks has been already determined.

In the above examples, the programming assistance device 4 includes the placement determination unit 101, the task determination unit 102, the path generation unit 103, the simulation unit 104, and the output unit 105, but the functional configuration of the simulation system is not limited thereto. As long as the simulation method and the method for manufacturing a robot according to the present disclosure can be executed, the programming assistance device 4 may include another functional configuration.

The hardware configuration of the simulation system is not limited to an example in which each functional module is implemented by executing a program. For example, at least part of the placement determination unit 101, the task determination unit 102, the path generation unit 103, the simulation unit 104, and the output unit 105 may be configured by logic circuitry specialized for the function thereof, or may be configured by an application specific integrated circuit (ASIC) in which the logic circuitry is integrated.

A procedure of method executed by at least one processor is not limited to the examples in the above examples. For example, some of the above-described steps (processes) may be omitted, or the steps may be executed in a different order. Furthermore, any two or more steps among the above-described steps may be combined, or part of the steps may be modified or deleted. Alternatively, other steps may be executed in addition to the steps described above. For example, corresponding to the fact that one of the placement determination unit 101 and the task determination unit 102 can be omitted, one of steps S11 and S12 can be omitted, and one of steps S17 and S18 can be omitted. The repetitive processing based on steps S16 to S18 in the above example may not be executed. The order of executing steps S11 and S12 may be changed, and correspondingly, the steps S17 and S18 may also be changed. For example, step S11 may be executed after step S12, and correspondingly, step S17 may be executed after step S18.

In a case where a magnitude relationship between two numerical values is compared in a computer system or a computer, either of two criteria of "equal to or greater than" and "greater than" may be used, and either of two criteria of "equal to or less than" and "less than" may be used.

We claim all modifications and variations coining within the spirit and scope of the subject matter claimed herein.

Regarding the above examples, the following appendices are provided by way of further illustration.

(Appendix 1) A simulation system comprising:
  a placement determination unit configured to determine placement of a robot with respect to another object based on a placement constraint related to the robot;
  a path generation unit configured to generate a path representing a trajectory between tasks executed by the robot, based on a relationship between the determined placement and the other object;
  a simulation unit configured to virtually execute an operation program including the generated path, in a virtual space in which the robot and the other object are placed; and
  an interference check unit configured to check whether the robot interferes with the other object, based on an execution result by the simulation unit.

(Appendix 2) The simulation system according to Appendix 1, wherein
  the path generation unit is configured to adjust the generated path in a case where the interference occurs,
  the simulation unit is configured to virtually execute the operation program including the adjusted path, and
  the interference check unit is configured to check whether the robot interferes with the other object.

(Appendix 3) The simulation system according to Appendix 2, wherein
  the placement determination unit is configured to adjust the placement of the robot in a case where the robot interferes with the other object in the operation program including the adjusted path,
  the path generation unit is configured to generate a path between tasks executed by the robot in the adjusted placement,
  the simulation unit is configured to virtually execute the operation program including the path corresponding to the adjusted placement, and
  the interference check unit is configured to check whether the robot interferes with the other object.

(Appendix 4) The simulation system according to any one of Appendices 1 to 3, further comprising:
  a task determination unit configured to determine a plurality of the tasks based on a task constraint related to the tasks,
  wherein the path generation unit is configured to generate a path between the determined the tasks based on a relationship between the determined placement and the other object, and the determined plurality of tasks.

(Appendix 5) The simulation system according to Appendix 4, wherein the task determination unit is configured to determine the plurality of tasks further based on the relationship between the determined placement and the other object.

(Appendix 6) The simulation system according to Appendix 4 or 5, further comprising a task check unit configured to check whether execution of the plurality of tasks succeeds, based on the execution result by the simulation unit.

(Appendix 7) The simulation system according to any one of Appendices 1 to 6, wherein the robot is a mobile robot capable of moving by itself with respect to the other object, and the operation program includes a task in which the mobile robot moves to a position corresponding to the determined placement.

(Appendix 8) The simulation system according to Appendix 7, wherein the operation program includes at least one task repeatedly executed by the mobile robot at the position corresponding to the determined placement.

(Appendix 9) A simulation system comprising:
a task determination unit configured to determine a plurality of tasks based on a task constraint related to tasks executed by a robot;
a path generation unit configured to generate a path between the determined tasks;
a simulation unit configured to virtually execute an operation program including the generated path, in a virtual space in which the robot and another object are placed; and
an interference check unit configured to check whether the robot interferes with the other object, based on an execution result by the simulation unit.

(Appendix 10) The simulation system according to Appendix 9, wherein
the path generation unit is configured to adjust the generated path in a case where the interference occurs,
the simulation unit is configured to virtually execute the operation program including the adjusted path, and
the interference check unit is configured to check whether the robot interferes with the other object.

(Appendix 11) The simulation system according to Appendix 10, wherein
the task determination unit is configured to adjust at least part of the plurality of tasks in a case where the robot interferes with the other object in the operation program including the adjusted path,
the path generation unit is configured to generate a path between the adjusted tasks,
the simulation unit is configured to virtually execute the operation program including the path corresponding to the adjusted task, and
the interference check unit is configured to check whether the robot interferes with the other object.

(Appendix 12) The simulation system according to any one of Appendices 9 to 11, further comprising a task check unit configured to check whether execution of the plurality of tasks succeeds, based on an execution result by the simulation unit.

(Appendix 13) A simulation method executed by a simulation system including at least one processor, the simulation method comprising:
a placement determination step of determining placement of a robot with respect to another object based on a placement constraint related to the robot;
a path generation step of generating a path representing a trajectory between tasks executed by the robot, based on a relationship between the determined placement and the other object;
a simulation step of virtually executing an operation program including the generated path, in a virtual space in which the robot and the other object are placed; and
an interference check step of checking whether the robot interferes with the other object, based on an execution result in the simulation step.

(Appendix 14) A simulation method executed by a simulation system including at least one processor, the simulation method comprising:

a task determination step of determining a plurality of tasks based on a task constraint related to tasks executed by a robot;
a path generation step of generating a path between the determined tasks;
a simulation step of virtually executing an operation program including the generated path, in a virtual space in which the robot and another object are placed; and
an interference check step of checking whether the robot interferes with the other object, based on an execution result in the simulation step.

(Appendix 15) A simulation program for causing a computer to execute:
a placement determination step of determining placement of a robot with respect to another object based on a placement constraint related to the robot;
a path generation step of generating a path representing a trajectory between tasks executed by the robot, based on a relationship between the determined placement and the other object;
a simulation step of virtually executing an operation program including the generated path, in a virtual space in which the robot and the other object are placed; and
an interference check step of checking whether the robot interferes with the other object, based on an execution result in the simulation step.

(Appendix 16) A simulation program for causing a computer to execute:
a task determination step of determining a plurality of tasks based on a task constraint related to tasks executed by a robot;
a path generation step of generating a path between the determined tasks;
a simulation step of virtually executing an operation program including the generated path, in a virtual space in which the robot and another object are placed; and
an interference check step of checking whether the robot interferes with the other object, based on an execution result in the simulation step.

(Appendix 17) A method for manufacturing a robot comprising:
a placement determination step of determining placement of the robot with respect to another object based on a placement constraint related to the robot;
a path generation step of generating a path representing a trajectory between tasks executed by the robot, based on a relationship between the determined placement and the other object;
a simulation step of virtually executing an operation program including the generated path, in a virtual space in which the robot and the other object are placed;
an interference check step of checking whether the robot interferes with the other object, based on an execution result in the simulation step; and
a control step of controlling the robot based on the operation program in a case where the interference does not occur.

(Appendix 18) A method for manufacturing a robot comprising:
a task determination step of determining a plurality of tasks based on a task constraint related to tasks executed by the robot;
a path generation step of generating a path between the determined tasks;
a simulation step of virtually executing an operation program including the generated path, in a virtual space in which the robot and another object are placed;

an interference check step of checking whether the robot interferes with the other object, based on an execution result in the simulation step; and
a control step of controlling the robot based on the operation program in a case where the interference does not occur.

(Appendix 19) A robot system comprising:
a placement determination unit configured to determine placement of a robot with respect to another object based on a placement constraint related to the robot;
a path generation unit configured to generate a path representing a trajectory between tasks executed by the robot, based on a relationship between the determined placement and the other object;
a simulation unit configured to virtually execute an operation program including the generated path, in a virtual space in which the robot and the other object are placed;
an interference check unit configured to check whether the robot interferes with the other object, based on an execution result by the simulation unit; and
a control unit configured to control the robot based on the operation program in a case where the interference does not occur.

(Appendix 20) A robot system comprising:
a task determination unit configured to determine a plurality of tasks based on a task constraint related to tasks executed by a robot;
a path generation unit configured to generate a path between the determined tasks;
a simulation unit configured to virtually execute an operation program including the generated path, in a virtual space in which the robot and another object are placed;
an interference check unit configured to check whether the robot interferes with the other object, based on an execution result by the simulation unit; and
a control unit configured to control the robot based on the operation program in a case where the interference does not occur.

What is claimed is:

1. A simulation system comprising circuitry configured to:
determine placement of a robot with respect to another object in a virtual space, based on a placement constraint applied to the robot for executing a plurality of tasks;
generate a path representing a trajectory of at least a portion of the robot or a tool operated by the robot during the tasks executed by the robot, based on a spatial relationship between the determined placement of the robot and the other object that satisfies the placement constraint;
execute an operation program including the generated path in the virtual space in which the robot and the other object are placed;
check whether the robot interferes with the other object, based on the spatial relationship between the determined placement of the robot and the other object along the generated path in the virtual space, as a result of executing the tasks in the operation program;
adjust the placement of the robot in the operation program that satisfies the placement constraint, in response to detecting interference between the robot and the other object;
generate an adjusted path in the operation program based on the adjusted placement of the robot relative to the other object; and
output the operation program including the tasks and the adjusted path, in response to confirming there is no interference between the robot and the other object along the adjusted path in the virtual space.

2. The simulation system according to claim 1, wherein the circuitry is further configured to, before adjusting the placement of the robot:
generate a pre-adjusted path while maintaining the determined placement of the robot;
execute the operation program including the pre-adjusted path in the virtual space; and
check whether the robot interferes with the other object, based on the spatial relationship between the determined placement of the robot and the other object along the pre-adjusted path in the virtual space.

3. The simulation system according to claim 2, wherein the circuitry is configured to adjust the placement of the robot, in response to detecting an interference between the robot and the other object on the pre-adjusted path.

4. The simulation system according to claim 1, wherein the circuitry is further configured to execute the operation program including the adjusted path in the virtual space, in order to confirm whether there is interference between the robot and the other object along the adjusted path.

5. The simulation system according to claim 1, wherein the tasks includes a first task and a second task that is performed subsequent to the first task, and
the circuitry is configured to generate, as at least part of the path, an air-cut path between the first task and the second task.

6. The simulation system according to claim 5, wherein the first task includes a first work path set by a user input,
the second task includes a second work path set by the user input, and
the circuitry is configured to generate the air-cut path so as to connect the first work path and the second work path.

7. The simulation system according to claim 6, wherein the circuitry is configured to generate the air-cut path so as to avoid the interference between the robot and the other object between the first task and the second task.

8. The simulation system according to claim 1, wherein the circuitry is further configured to:
determine the tasks based on a task constraint applied to the tasks executed by the robot;
generate the path including the trajectory of the portion of the robot or the tool that is executing the determined tasks; and
generate the adjusted path including the trajectory of the portion of the robot or the tool that is executing the determined tasks.

9. The simulation system according to claim 8, wherein the circuitry is configured to determine the tasks further based on the spatial relationship between the determined placement of the robot and the other object.

10. The simulation system according to claim 8, wherein the circuitry is configured to further check whether the robot is able to execute the determined tasks, based on the spatial relationship between the determined placement of the robot and the other object, as the result of executing the determined tasks in the operation program.

11. The simulation system according to claim 8, wherein the circuitry is configured to:
adjust at least part of the determined tasks in response to detecting the interference between the robot and the other object; and generate the adjusted path further based on the adjusted tasks.

12. The simulation system according to claim 1, wherein the robot is a mobile robot capable of moving by itself with respect to the other object, and
at least one of the tasks causes the mobile robot to move to a position corresponding to the adjusted placement.

13. The simulation system according to claim 12, wherein at least one of the tasks is repeatedly executed by the mobile robot at the position corresponding to the adjusted placement.

14. The simulation system according to claim 1, wherein the circuitry is further configured to output the operation program to control the robot.

15. The simulation system according to claim 14, wherein the circuitry is further configured to output the operation program to a robot controller to cause the robot controller to control the robot.

16. A simulation system comprising circuitry configured to:
determine a plurality of tasks based on a task constraint applied to the task executed by a robot;
generate a path representing a trajectory of at least a portion of the robot or a tool operated by the robot during the determined tasks executed by the robot;
execute an operation program including the generated path in a virtual space in which the robot and another object are placed;
check whether the robot interferes with the other object, based on the determined tasks, as a result of executing the determined tasks in the operation program;
adjust at least part of the tasks in the operation program that satisfies the task constraint, in response to detecting interference between the robot and the other object;
generate an adjusted path in the operation program based on the adjusted tasks; and
output the operation program including the adjusted tasks and the adjusted path, in response to confirming there is no interference between the robot and the other object along the adjusted path in the virtual space.

17. The simulation system according to claim 16, wherein the circuitry is further configured to, before adjusting the tasks:
generate a pre-adjusted path while maintaining the determined tasks;
execute the operation program including the pre-adjusted path in the virtual space; and
check whether the robot interferes with the other object, based on the determined tasks.

18. The simulation system according to claim 17, wherein the circuitry is configured to adjust the tasks, in response to detecting the interference between the robot and the other object on the pre-adjusted path.

19. The simulation system according to claim 16, wherein the circuitry is further configured to execute the operation program including the adjusted path in the virtual space, in order to confirm whether there is interference between the robot and the other object along the adjusted path.

20. The simulation system according to claim 16, wherein
the determined tasks includes a first task and a second task performed subsequent to the first task, and
the circuitry is configured to generate, as at least a part of the path, an air-cut path between the first task and the second task.

* * * * *